(12) United States Patent
Weenen et al.

(10) Patent No.: US 8,859,029 B2
(45) Date of Patent: Oct. 14, 2014

(54) EARLY STIMULATION OF TASTE AND/OR FLAVOUR ACCEPTANCE

(75) Inventors: Hugo Weenen, Blaricum (NL); Martine Sandra Alles, Apeldoorn (NL)

(73) Assignee: N.V. Nutricia, Zoetermeer (NL)

( * ) Notice: Subject to any disclaimer, the term of this patent is extended or adjusted under 35 U.S.C. 154(b) by 0 days.

(21) Appl. No.: 13/992,695

(22) PCT Filed: Dec. 12, 2011

(86) PCT No.: PCT/NL2011/050843
§ 371 (c)(1),
(2), (4) Date: Aug. 16, 2013

(87) PCT Pub. No.: WO2012/078046
PCT Pub. Date: Jun. 14, 2012

(65) Prior Publication Data
US 2013/0337106 A1   Dec. 19, 2013

(30) Foreign Application Priority Data

Dec. 10, 2010  (WO) ................ PCT/NL2010/050841

(51) Int. Cl.
*A23L 1/0562* (2006.01)
*A23L 1/29* (2006.01)
*A23L 1/305* (2006.01)
*A23C 9/20* (2006.01)

(52) U.S. Cl.
CPC ................ *A23L 1/296* (2013.01); *A23L 1/293* (2013.01); *A23L 1/3053* (2013.01); *A23C 9/20* (2013.01); *A23L 1/3056* (2013.01); *A23L 1/3055* (2013.01); *Y10S 426/801* (2013.01)
USPC ........... 426/648; 426/580; 426/634; 426/656; 426/801

(58) Field of Classification Search
USPC .......................... 426/580, 634, 648, 656, 801
See application file for complete search history.

(56) References Cited

U.S. PATENT DOCUMENTS

2004/0101596 A1   5/2004   Ndife et al.
2008/0175952 A1   7/2008   Terragno et al.

FOREIGN PATENT DOCUMENTS

WO   WO-2007/091886 A1   8/2007

OTHER PUBLICATIONS

Birch, et al. "Infants' Consumption of a New Food Enhances Acceptance of Similar Foods", Appetite, 1998, vol. 30, Article No. ap970146, pp. 283-295.

Blossfeld, et al., "Relationships between acceptance of sour taste and fruit intakes in 18-month-old infants", British Journal of Nutrition, 2007, vol. 98, pp. 1084-1091.
Gerrish, et al. "Flavor variety enhances food acceptance in formula fedinfants", The American Journal of Clinical Nutrition, 2001, vol. 73, pp. 1080-1085.
International Preliminary Report on Patentability in PCT/NL2011/050843 dated Feb. 25, 2013.
International Search Report in PCT/NL2011/050843 dated Feb. 8, 2012.
Maier, et al. "Breastfeeding and experience with variety early in weaning increase infants' acceptance of new foods for up to two months", Clinical Nutrition, 2008, vol. 27, pp. 849-857.
Mannella, et al. "Developmental Changes in the Acceptance of Protein Hydrolysate Formula", Journal of Developmental and Behavioral Pediatrics, Dec. 1996, vol. 17, No. 6, pp. 386-391.
Mennella, J. et al. "Flavor experiencs during formula feeding are related to preferences during childhood", Early Human Development, 2002, vol. 68, pp. 71-82.
Mennella, J. et al. "Vegetable acceptance by infants: Effects of formula flavors", Early Human Development, 2006, vol. 82, pp. 463-468.
Mintel, "Hypoallergenic 2 Premium Follow-Up Formula", Jun. 2006, http://www.gnpd.com, 2 pgs, XP002657055.
Mintel, "Hypoallergenic Infant Formula", Nov. 2007, http://www.gnpd.com, 2 pgs, XP002657054.
Mintel, "Milk-Based Formula", Jun. 2007, 2 pgs, XP002657680.
Mintel, "Soy Baby Formula", Sep. 2007, 2 pgs, XP002657679.

*Primary Examiner* — Helen F Heggestad
(74) *Attorney, Agent, or Firm* — Gilberto M. Villacorta; Sunit Talapatra; Foley & Lardner LLP

(57) ABSTRACT

The invention relates to a kit of parts comprising 2 to 100 containers each containing an infant formula, wherein each infant formula is in a form suitable for administration to an infant and/or toddler or in a form suitable for administration to an infant and/or toddler after admixing with an aqueous liquid, wherein the kit of part comprises at least two different infant formulas which differ from each other in taste and/or flavor by having a different protein fraction or by being a fermented infant formula, wherein each of the different protein fractions is selected from the group consisting of intact milk proteins including cow milk proteins, intact plant proteins including soy protein, hydrolysed proteins, free amino acids, or mixtures of two or more thereof. The invention further relates to the use of such kit of parts for stimulating the acceptance and/or liking of a broad range of fruits, vegetables and/or whole grain cereal products by infants and/or toddlers or later in life. In another aspect, the invention relates to such kit of parts for increasing familiarization with multiple tastes and/or flavors and/or for reducing the risk of food refusal and/or other eating difficulties. In a further aspect the invention relates to such kit of parts for the prevention of obesity, diabetes, atherosclerosis, hypertension, cardiovascular diseases, high blood pressure and cancer at an age of above 36 months.

10 Claims, No Drawings

EARLY STIMULATION OF TASTE AND/OR FLAVOUR ACCEPTANCE

CROSS-REFERENCE TO RELATED APPLICATIONS

This application is the National Phase of International Patent Application No. PCT/NL2011/050843, filed Dec. 12, 2011, published as WO 2012/078046, which claims priority to International Application No. PCT/NL2010/050841, filed Dec. 10, 2010, The contents of these applications are herein incorporated by reference in their entirety.

FIELD OF THE INVENTION

The present invention relates to a kit of parts comprising 2 to 100 containers, each container containing an infant formula, wherein the kit of part comprises at least two different infant formulas which differ from each other in taste and/or flavour, to the use of such kit of parts for stimulating the acceptance and/or liking of a broad range of fruits, vegetables and/or whole grain cereal products by infants and/or toddlers and later in life and to such kit of parts for the prevention and/or treatment of food neophobia and for the prevention of diseases later in life.

BACKGROUND OF THE INVENTION

The consumption of fruits, vegetables and fibre-rich foods is very important for humans to maintain good health. Authorities and health organisations have repeatedly pointed to the importance of eating sufficient fruits, vegetables and fibre-rich foods in an attempt to prevent diseases such as obesity, cancer and cardiovascular diseases from occurring. Despite all such efforts, the consumption of fruit, vegetables and fibre-rich foods continues to be low and diseases like obesity and diabetes are taking epidemic forms. For a group of subjects, the low consumption of fruit, vegetables and fibre-rich food is likely to be caused by a disorder called food neophobia.

Food neophobia is an eating disorder sometimes referred to as "fussy or picky eating" disorder. As the word 'neo', means 'new', and the word 'phobia' means fear, it quite literally means a fear of trying new things. Food neophobia is particularly common in toddlers and young children. Generally, children will overcome food neophobia during their adolescence and teenage years. However, many subjects continue to have food neophobia as an adult.

It seems that the liking of the typical taste and/or flavours of acid fruits, bitter vegetables or bitter whole grain cereal products can be stimulated by exposing infants and/or toddlers to these tastes and flavours, early, gradually and stepwise. In WO2007/091886 for example, is disclosed the use of different vegetables and fruits for administration to an infant for stimulating the consumption of vegetables and fruits later in life. In Birch L L, Gunder L, Grimm-Thomas L, *Infant's consumption of a new food enhances acceptance of similar foods, Appetite* 30 (1998), p. 283-295, it is disclosed that exposing infants to a fruit puree increases the acceptance of other fruit purees and exposing infants to vegetables increases their acceptance of other vegetable purees. In Blossfeld I et al, *Relationships between acceptance of sour taste and fruit intakes in 18-month-old infants, Br. J. Nutr.* 98 (2007), p. 1084-1091, a relationship between sour acceptance and fruit intake is shown. In Mennella J A, Beauchamp G K; *J Dev Behav Pediatr.* 17 (1996), p. 386-391, it is mentioned that for improving the acceptance of bitter taste it appears important to introduce infants very early in life to bitter tasting formula.

In Gerrish C J, and Mennella J A, *Flavor variety enhances food acceptance in formula fed infants. Am. J. Clin. Nutr,* 73 (2001), p. 1080-1085, it is shown that exposing infants to a variety of pureed vegetables enhances the acceptance of novel foods in human infants. In Maier A. S. et al., *Breastfeeding and experience with variety early in weaning increase infants' acceptance of new foods for up to two months, Clinical Nutrition* 27 (2008), 849-85, it is disclosed that the effect of exposure to a variety of vegetables at weaning on new food acceptance is still visible up to 2 months after the intervention. The latter study also shows that, in a given period, the number of daily changes rather than the number of different foods led to a later higher acceptance of new foods. In other words, introducing at least 3 different new foods over e.g. 9 days by offering a different food from one day to another, leads to a later greater acceptance of new foods than presenting each food over a period of 3 consecutive days.

It can thus be concluded that exposure of infants and toddlers early in life to a variety of different tastes is important for stimulating the liking of a broad range of food.

SUMMARY OF THE INVENTION

The dislike of bitter and sour taste seems to be innate and appears to increase in the first few months of life, which appears to be an obstacle in the development of healthy food preferences. The disliking of sour taste by infants and/or toddlers may be an important factor for the disliking of certain fruits and the disliking of bitterness appears to be an important factor for the disliking of vegetables, vegetable containing meals and whole grain cereal products. Without wishing to be bound to any theory, the inventors believe that by exposing infants and/or toddlers to a variety of tastes in infant formulas during the weaning and pre-weaning period, the acceptance of new foods including fruits, vegetables and/or whole grain cereal products can be improved. As a consequence, the development of healthy food preferences could be improved. Similarly, the inventors believe that exposing infants and/or toddlers to a variety in mouth feel, e.g. thickness, creaminess, roughness, astringency, in infant formulas, the acceptance later in life of new foods including fruits, vegetables and/or whole grain cereal products can be improved. As a consequence, the development of healthy food preferences could be improved.

There is thus a need in the art for a method for exposing infants and/or toddlers early in life, i.e. in the pre-weaning and weaning period, to a variety of different tastes and/or flavours. In this phase of life, infants and/or toddlers are typically at least partly bottle-fed.

It has now been found that by varying the protein base in an infant formula and/or by fermenting an infant formula, infant formulas that vary in taste and flavour can be provided that are suitable to be administered to bottle-fed infants and/or toddlers in the pre-weaning and weaning period. By feeding the infants and/or toddlers with such different infant formulas, the infants are exposed early in life to different tastes, including bitter, sour, and umami tastes, that resemble the typical taste and flavours of for example sour fruits, bitter vegetables, bitter whole grain cereal products and meat (umami). It is believed that this will stimulate acceptance of such tastes and flavours in infants and later in life and will thus lead to a healthier food intake pattern later in life and consequently in the prevention of certain diseases later in life that are related to an unbalanced food intake such as obesity, diabetes, atherosclerosis, hypertension, cardiovascular diseases, high blood pressure and cancer.

By providing such different infant formulas in a kit of parts comprising a plurality of containers with infant formula, a convenient tool is provided that helps providing a variety of infant formulas to infants and/or toddlers.

Accordingly, the present invention relates to a kit of parts comprising 2 to 100 containers enclosed in a single packaging or interconnected, each container containing an infant formula, wherein each infant formula is in a form suitable for administration to an infant and/or toddler or in a form suitable for administration to an infant and/or toddler after admixing with an aqueous liquid, wherein the kit of part comprises at least two different infant formulas which differ from each other in taste and/or flavour by having a different protein fraction or by being a fermented infant formula, wherein each of the different protein fractions is selected from the group consisting of intact milk proteins including cow milk proteins, intact plant proteins including soy protein, hydrolysed proteins, free amino acids, or mixtures of two or more thereof.

The taste, flavour and variety characteristics of the different infant and/or toddler formulas in the kit of parts are preferably determined, compared and matched with the typical taste and flavour characteristics of various target fruits, vegetables and whole grain cereal products. It has been found that by using different protein fractions or fermented infant formula, a degree of resemblance with such target foods is possible that warrants the use of the kit of parts for the improvement of fruit, vegetable and whole grain cereal products acceptance by infant and/or toddlers and later in life, i.e. above the age of toddlers, i.e. typically at an age above 36 months.

Thus, a method for improving the acceptance of different tastes and/or flavours is provided. Accordingly, the invention further relates to the use of the kit of parts as hereinabove defined for stimulating the acceptance and/or liking of a broad range of fruits, vegetables and/or whole grain cereal products by infants and/or toddlers.

In a further aspect, the invention relates to use of the kit of parts as hereinabove defined for feeding to an infant and/or toddler for stimulating the acceptance and/or liking of a broad range of fruits, vegetables and/or whole grain cereal products at an age above 36 months.

In a still further aspect, the invention relates to use of the kit of parts as hereinabove defined for increasing familiarisation with multiple tastes and/or flavours and/or for reducing the risk of food refusal and/or other eating difficulties.

The invention also relates to a kit of parts as hereinabove defined for the prevention and/or treatment of food neophobia and for the prevention of obesity, diabetes, atherosclerosis, hypertension, cardiovascular diseases, high blood pressure and cancer at an age above 36 months.

DETAILED DESCRIPTION OF THE INVENTION

Kit of Parts

The present invention provides a "kit of parts" comprising 2 to 100 containers. Each container contains an infant formula. The containers may be in any suitable form for infant formula containers. Preferably, the containers are in the form of a bag, can, cup, jar, or sachet. The containers are preferably constructed to ensure hygienic protection against contamination and spoilage, e.g. dust, dirt and bacteria. The containers are suitably made from plastic, paper and/or aluminium. For liquid infant formula, the container is preferably in the form of a cup with a sealed lid, preferably a sealed lid that can be peeled-off. For powder formula, the containers are preferably in the form of a bag or sachet. The containers are provided as a kit of parts by being enclosed in a single packaging (e.g. carton, box, net or foil) or by interconnecting the containers by other means, for example by breakable interconnectors.

Preferably, the kit of parts comprises at least three containers, more preferably the kit of parts comprises three to fifty containers.

The kit of parts may contain infant formula in the form of a tablet or in an otherwise compressed form. One or more tablets may be contained in single container, preferably a foil or a sachet, more preferably a foil. Preferably, a number of tablets of the same composition that is suitable for make one bottle of 200 ml infant formula are packaged in a single container, preferably a foil or sachet. The foils or containers preferably have a different color for different infant formulas in the kit of parts, in order to make it easily visible that it contains different infant formula. In case the infant formula is in the form of a tablet, a large number of foils with different tasting infant formulas may advantageously be combined in one box. Such box can be a cheap carton box since the tablets are packaged in a foil.

Infant Formula

Infant formula is a food manufactured to support adequate growth of infants under six months of age when fed as a sole source of nutrition. The composition of infant formulas is roughly based on mother's milk at approximately one to three months postpartum. The standard infant formulas contain purified cow's milk whey and casein as a protein fraction, a blend of vegetable oils as a fat fraction, lactose as a digestible carbohydrate fraction, and may comprise dietary fiber with prebiotic activity, probiotic bacteria, a vitamin-mineral mix, and further ingredients, depending on the manufacturer.

Formula for older children, up to the age of three years are available as "follow-on formula" and "toddler formula". These formula for older children comprise specifically age adapted concentrations of the ingredients mentioned above.

For the purpose of the present patent application, when the term infant formula is used, it is meant to include infant, follow-on and toddler formula.

Reference herein to infants and/or toddlers is to children up to the age of 36 months.

The infant formulas in the kit of part may be in any form that is as such suitable for administration to an infant/or toddler, preferably in the form of a liquid. Alternatively the infant formulas are in a form that is suitable for administration to an infant/or toddler after admixing the infant formula with an aqueous liquid, preferably water. Preferably, the infant formulas are in powder or liquid form. One kit of parts may comprise infant formulas in different forms, preferably, all infant formulas in a single kit of parts are in the same form.

The infant formulas preferably have a composition typical for infant formulas, i.e. a protein fraction, a fat fraction and a digestible carbohydrate fraction. Preferably, the protein fraction provides in the range of from 5 to 40 en %, the fat fraction in the range of from 5 to 60 en % and the indigestible carbohydrate fraction in the range of from 15 to 90 en % of the infant formula. Reference herein to en % is to energy percentage and represents the relative amount each fraction contributes to the total caloric value of the formula. The infant formulas may comprise further ingredients such as for example prebiotic non-digestible oligosaccharides, probiotic bacteria, or minerals.

The infant formula may comprise a thickener. In particular in an infant formula for infants from the age of 4 months or for toddlers, a thickener can advantageously be used to increase the viscosity of the formula in the form suitable for administration. The use of thickened infant formulas has the advantage that a spoon can be used to feed the infant and/or toddler. This is particularly preferred when weaning the infant and/or toddler that is used to drink food only.

Any thickener known to be suitable for infant formulas may be used. Examples of suitable thickeners are starch, guar gum, locust bean gum, pectin, xanthan gum, carrageenan, furcelleran, oat gum, tragacanth, gum arabic, karaya gum, tara gum, gellan gum, cellulose. Preferably the thickener is selected from the group consisting of locust bean gum, starch, pectin or mixtures thereof.

The thickeners preferably do not influence the taste and/or flavour of the infant formula in the form suitable for administration and preferably result in an infant formula with a viscosity that is stable in time. Preferably, the infant formula comprises thickener in such amount that the infant formula in the form suitable for administration has a viscosity in the range of from 100 to 100,000 mPas at a shear rate of 50 per second and 20° C., more preferably in the range of from 500 to 10,000 mPas at a shear rate of 50 per second and 20° C. Preferably starch, locust bean gum, pectin or mixtures thereof are used as thickeners.

The infant formula in the form suitable for administration preferably has an osmolality in the range of from 50 to 500 mOsm/kg, more preferably of from 100 to 400 mOsm/kg. The caloric density of the infant formula in the form suitable for administration is preferably between 0.1 and 2.5 kcal/ml, more preferably between 0.5 and 1.5 kcal/ml, even more preferably between 0.6 and 0.8 kcal/ml.

Protein Fraction and Taste and Flavour Variety

Each container comprises an infant formula. The kit of parts comprises at least two, preferably at least three, different infant formulas which differ from each other in taste and/or flavour. The different infant formulas may differ in taste and/or flavour because they have a different protein fraction or because they are a fermented infant formula. The different infant formulas are preferably selected for their sensory characteristics and their differences in sensory characteristics.

Sensory characteristics of a food product can be determined using sensory profiling. Sensory profiling, also known as descriptive analysis, is the process during which a panel of trained assessors scores several sensory attributes on a number of products to be compared. The data result in a 3-way table crossing panelists, products and attributes. The data analysis could be directed to describe either the panelist performances or the product differences. This analysis can be done by attribute and multivariate, that is by sets of attributes defining different types of sensations, such as appearance, odour, texture, taste and flavour. Using this technique, infant formula can be optimised based on the sensory characteristics of target fruits, vegetables and/or whole grain cereal products.

The different infant formulas either comprise a different protein fraction, each protein fraction selected from the group consisting of intact milk proteins including cow milk proteins, intact plant proteins, hydrolysed proteins, free amino acids and mixtures of two or more thereof, or one of the different infant formulas is a fermented infant formula. The plant proteins may for example be soy protein, pea protein, or potato protein, preferably soy protein. The hydrolysed proteins and the free amino acids, are preferably derived from intact animal milk proteins, preferably bovine milk protein, more preferably cow milk protein or from intact plant proteins, preferably soy protein.

Reference herein to a fermented infant formula is to an infant formula that is fermented by lactic acid producing bacteria, such as for example by bifidobacteria, lactobacilli and/or *Streptococcus thermophilis*. The infant formula may be fermented by suitable fermentation process. Such processes are well-known in the art. An example of a suitable process is the process disclosed in WO 2009/151330. A fermented infant formula comprises lactic acid and therefore its predominant taste is typically a sour taste. The infant formula that is fermented may be a standard infant formula, i.e. based on cow milk protein, or an infant formula comprising plant proteins such as for example soy protein.

Preferably, the kit of parts comprises a selection of different infant formulas, each with a different predominant taste and/or flavour characteristic. More preferably, the predominant taste and/or flavour characteristic are selected from:

a standard infant formula having a protein fraction consisting of intact cow milk protein (no specific predominant taste characteristic);

an infant formula having a protein fraction consisting of or predominantly comprising a hydrolysed protein (bitter, sour, and/or umami taste characteristic, depending inter alia on the source of protein and on the degree of hydrolysis);

a fermented infant formula (sour taste characteristic);

an infant formula having a protein fraction consisting of or predominantly comprising intact or hydrolysed soy protein (astringent taste characteristic); and an infant formula having a protein fraction consisting of or predominantly comprising amino acids (bitter, sour and/or umami taste characteristic).

Reference herein to a protein fraction predominantly comprising certain proteins is to a protein fraction comprising at least 60 wt %, preferably at least 80 wt %, more preferably at least 90 wt % of such proteins based on the total weight of protein in the protein fraction.

Preferably, the different infant formulas are selected from the group consisting of standard infant formula, i.e. an infant formula with intact cow milk proteins, an infant formula having a protein fraction consisting of or predominantly comprising hydrolysed milk protein, a fermented infant formula, an infant formula having a protein fraction consisting of or predominantly comprising soy protein, an infant formula having a protein fraction consisting of or predominantly comprising free amino acids. Preferably, the kit of parts comprises at least a fermented infant formula, an infant formula comprising hydrolysed protein and an infant formula comprising soy protein.

One or more fruit and/or vegetable ingredients may be added to one of more of the infant formulas in the kit of parts. The fruit and/or vegetable ingredients may be added in any suitable form, for example as juice, puree or powder.

Use

The kit of parts and method according to the invention is suitably used for providing infant formula to infants and/or toddlers in the pre-weaning, early weaning period or late weaning period. Reference herein to the pre-weaning period is the period when solid foods are introduced before solid food is given to an infant and/or toddler. Reference herein to the early weaning period is the period when solid foods are introduced. For most children, the pre-weaning period covers the 0 to 6 months period, early weaning the period from 4 to 9 months, late weaning the period from 9 to 36 months. Preferably, the kit of parts according to the invention is used for providing infant formula to infants and/or toddlers having an age of below 12 months. The kit of parts is particularly suitable for providing infant formula to infants and/or toddlers in the pre-weaning and early weaning period.

The kit of parts according to the invention may suitably be used for stimulating the acceptance and/or liking of different taste and/or flavours, for stimulating the consumption of vegetables and fruit by infants and toddlers and later in life, i.e. typically at an age of above 36 months, for increasing familiarisation with multiple tastes and/or flavours, for reducing the risk of developing food neophobia, food refusal and/or other eating difficulties, and/or for reducing the occurrence of certain diseases related to unbalanced intake of food later in life, such as for example obesity, diabetes, atherosclerosis, hypertension, cardiovascular diseases, high blood pressure and cancer.

The kit of parts preferably comprises instructions on how to administer a variety of infant formulas to an infant and/or toddler. Preferably, it is indicated on the kit of parts that the purpose of the kit of parts is to expose the infant and/or toddler to a variety of tastes and/or flavours and that such exposure during the early stages of life increases the liking of a broad range of fruits, vegetables and/or whole grain cereal products, and stimulates consumption of fruits, vegetables and/or whole grain cereal products later in life. More preferably, it is also indicated that stimulation of consumption of fruit and vegetables helps reducing the occurrence of diseases later in life, such as for example obesity, diabetes, atherosclerosis, hypertension, cardiovascular diseases, high blood pressure and cancer.

In case the kit of parts comprises infant formulas in powder form, the kit of parts preferably comprises instructions on how to prepare a formula in a form suitable for administration to an infant and/or toddler, i.e. a liquid formula.

Preferably, the kit of parts is used in such a way that at least each consecutive day, a different infant formula is administered. More preferably at least two different infant formulas are administered on the same day.

Reference herein to whole grain cereal products is to cereal products including breads, pastas, and cereals that are made with whole grain kernels or whole grain flour instead of with bleached, processed flour. Whole grain flours are made from the whole kernels of grain, i.e. both the inside part of the grain kernel and the outer hull. Whole grain cereal products and flours include, but are not limited to, 100% whole wheat, brown rice, bulger, corn, buckwheat, oatmeal, spelt, and wild rice.

Method for Improving Taste and/or Flavour Acceptance

In a further aspect the present invention provides a method for stimulation of taste and/or flavour acceptance in infants and/or toddlers, comprising administering to the infant and/or toddler at least two different infant formulas, which differ from each other in taste and/or flavor by having a different protein fraction or by being a fermented infant formula, wherein each of the different protein fractions is selected from the group consisting of intact milk proteins including cow milk proteins, hydrolysed proteins, soy proteins, pea proteins, free amino acids, or mixtures of two or more thereof. Preferably, the method comprises administering to the infant and/or toddler a third or further infant formula which differ in taste and/or flavour from the first and second infant formula and from each other, each by having a differently tasting protein fraction or by being a fermented infant formula Preferably, the infant formulas have a different taste selected from sweet, bitter, sour, and salty/umami taste, or an astringent mouthfeel.

Preferably, the infants and/or toddlers have an age of below 8 months, more preferably below 6 months.

The method can suitably also be used for stimulating the acceptance of different tastes and/or flavours; for stimulating the consumption of plant material such as vegetables and fruit later in life; for increasing familiarisation with multiple tastes and/or flavours; for reducing the risk of developing food neophobia, food refusal and/or other eating difficulties; and/or for reducing the occurrence of diseases related to an unbalanced food intake, such as obesity, diabetes, atherosclerosis, hypertension, cardiovascular diseases, high blood pressure and cancer, later in life, in particular at an age above 36 months.

EXAMPLES

Example 1

The following non-limiting examples of commercially available infant formulas can suitably be used in the kit of parts according to the present invention:

Formula with a neutral taste and/or flavour (standard infant milk formula with intact cow's milk protein): Cow & Gate First infant milk, Cow & Gate infant milk for hungrier babies, Cow & Gate follow-on milk, Nutricia Nutrilon 1, Nutricia Nutrilon 2.

Formula with a sour taste (comprising fermented proteins): Gallia lactofidus lait 1er age, Gallia lactofidus lait 2eme age.

Formula with a bitter and/or umami taste (hydrolysed proteins): Cow & Gate Pepti-Junior, Aptamil Pepti, Pepti-Cate, Omneo.

Formula with a bitter and/or umami (free amino acids): Neocate, Neocate LCP.

Formula with an astringent mouthfeel (soy proteins): Cow & Gate Infa Soy.

Formula with a bitter taste: infant formulas with a protein fraction based on pea proteins or other plant proteins other than soy protein.

Example 2

Sensory Analysis

In order to show to what extent the taste characteristics of a variety of infant formulas and mixtures of infant formulas resemble the tastes characteristics of a variety of vegetables, fruits and whole grain products that are typical healthy foods for children, the following sensory measurements were carried out.

A variety of samples of commercially available infant milk formulas suitable to be used in the kit of parts according to the invention and a variety of samples of vegetables (purees and fresh vegetables), fruits (purees and fresh fruit) and grain products were evaluated by a sensory panel composed of nine panelists, screened for their ability to do sensory testing and trained in sensory descriptive analysis. Three different attributes of the samples, i.e. the bitterness, sourness and astringency, were assessed by the panel members relative to standard solutions for bitterness, sourness and astringency. For each of the attributes, water was given as the standard for the low intensities, which had for each attribute a fixed rating at 10% of the scales (at 10 mm on a 100 mm line scale). The high intensity standards had a fixed rating at 90% of the 100 mm scale and had the following composition:

Bitterness: 0.04% caffeine in water;
Sourness: 0.06% citric acid in water;
Astringency: 100% Gallia lactofidus lait 2eme age.

Products were rated for the intensity of each of the attributes on a 100 mm line scale.

Vegetables, fruits and the cereal products were each evaluated in separate sessions together with the infant formulas specified below. Panelists were asked to first rank the samples in order of increasing intensity for each attribute separately, and then to rate the intensities of each attribute for each sample on the 100 mm scale on a computer screen.

Infant formula-powder was added to (tap)water (ambient temperature) in a ratio according to the instructions on the package and prepared by mixing with an egg-beater. The ready-to-drink infant formulas and foods were served in coded cups and then immediately given to the panelists. Products were consumed by taking sips (infant formulas) or with a spoon (foods). To avoid differences in sensory perception as a result of temperature differences, all products were tasted at ambient temperature. The mean ratings were calculated and significances for differences calculated by means of analysis of variance (anova). For all attributes significant product differences were obtained.

Infant Formulas

The following infant formulas were used:

A standard follow-on infant formula based on intact cow milk protein: Nutrilon Standaard 2 (IFFO-Nutrilon)

A fermented follow-on infant formula: Gallia lactofidus lait 2eme age (IFFO-Gallia)

A follow-on infant formula based on intact soy protein: Nutrilon Soya 2 (IFFO-Soy)

Two hypo-allergenic follow-on infant formula based on hydrolysed proteins: Nutrilon H. A. 2 (IFFO-HA) and Nutrilon Omneo (IFFO-Omneo)

An infant formula based on free amino acids (Neocate) mixed with a standard follow-on formula (Nutrilon Standaard 2) in a ratio of 1:1 (vol/vol of ready to drink products)

The infant formula based on free amino acids (Neocate) has strong to very strong taste intensities. Therefore a mixture of Neocate with a standard follow-on formula (Nutrilon Standaard 2) in a ratio of 1:1 (vol/vol of ready to drink products) was used in the sensory analysis, in order to use an infant formula mixture that has a taste intensity in the same range as the target foods.

Foods

The following vegetables that were used for sensory analysis:

Vegetables purees for infants of 4+ months of the Olvarit and Nutricia brands: carrots, cauliflower, green beans and broccoli; of the Bledina brand: pumpkin, artichoke, zucchini+potato and spinach.

Fresh lettuce.

The following fruits were used for sensory analysis:

Fruit purees for infants of 4+months of the Mellin brand: apple, apricot, peach and prune; of the Olvarit and Nutricia brands: pear and banana; of the Bledina brand: peach apple, banana and apple.

Fresh fruit: apple with skin, orange pieces and grapefruit pieces.

The following grain products that were used for sensory analysis:

Pieces of whole wheat and white bread crumb.

Bambix multi-cereal for babies 12+months and Bambix rice cereal for babies 4+months.

Results

TABLE 1

Sensory ratings for bitter and sour taste and astringency of different infant milk formulas and a wide variety of fruits and fruit purees

| Product | sourness | bitterness | astringency |
| --- | --- | --- | --- |
| Grapefruit pieces | 97.0 | 96.9 | 50.5 |
| Apricot - Mellin | 88.0 | 23.7 | 47.6 |
| Peach - Mellin | 79.2 | 20.1 | 35.4 |
| Peach/Apple - Bledina | 75.2 | 38.1 | 38.9 |

TABLE 1-continued

Sensory ratings for bitter and sour taste and astringency of different infant milk formulas and a wide variety of fruits and fruit purees

| Product | sourness | bitterness | astringency |
| --- | --- | --- | --- |
| Orange pieces | 70.4 | 34.4 | 17.9 |
| Prune - Mellin | 57.7 | 18.4 | 52.3 |
| Banana - Bledina | 49.9 | 29.3 | 37.8 |
| Apple - Bellin | 49.1 | 14.5 | 29.0 |
| IFFO - Gallia | 46.0 | 42.9 | 67.0 |
| Pear - Nutricia | 41.5 | 20.4 | 47.6 |
| Banana - Nutricia | 39.0 | 21.7 | 48.3 |
| Apple - Bledina | 33.7 | 18.9 | 29.1 |
| IFFO - Omneo | 28.6 | 86.3 | 80.1 |
| IFFO - HA | 24.5 | 84.8 | 70.7 |
| IFFO- Neocate/Nutrilon Standaard 2 | 23.2 | 51.4 | 42.6 |
| Apple with skin | 17.3 | 12.3 | 33.7 |
| IFFO - Soy | 9.0 | 28.7 | 49.1 |
| IFFO - Nutrilon | 4.0 | 3.9 | 15.6 |

Although some of the fruits are sourer than the most sour infant formula (Gallia Lactofidus), there is a clear difference in sourness between the different infant formulas. Offering such different infant formulas to infants van therefore help to improve the acceptance of sour products. For bitterness and astringency, there is a good match in the range of the intensities for the selected infant formulas and the selected fruits and fruit purees.

TABLE 2

Sensory ratings for bitter and sour taste and astringency of different infant milk formulas and a wide variety of vegetables

| Product | sourness | bitterness | astringency |
| --- | --- | --- | --- |
| lettuce | 41.9 | 99.0 | 69.3 |
| IFFO - Omneo | 31.0 | 82.1 | 80.1 |
| broccoli - Nutricia | 67.0 | 75.7 | 65.1 |
| IFFO - HA | 28.7 | 75.1 | 70.7 |
| artichoke - Bledina | 44.9 | 74.4 | 76.2 |
| spinach - Bledina | 41.9 | 68.5 | 82.6 |
| Green beans - Nutricia | 54.7 | 64.9 | 71.0 |
| pumpkin - Bledina | 47.8 | 46.7 | 39.0 |
| cauliflower - Nutricia | 24.7 | 42.2 | 53.2 |
| IFFO - Neocate/Nutrilon Standaard 2 | 20.0 | 31.1 | 42.6 |
| IFFO - Gallia | 53.8 | 28.2 | 67.0 |
| zucchini - Bledina | 25.7 | 14.1 | 25.5 |
| IFFO - Soy | 10.8 | 13.8 | 49.1 |
| carrots - Hami | 20.7 | 7.6 | 24.4 |
| IFFO - Nutrilon | 4.7 | 3.3 | 15.6 |

For sourness, bitterness and astringency, there appears to be is a good match in the range of the intensities for the infant formulas and the selected vegetable and vegetable purees.

TABLE 3

Sensory ratings for bitter and sour taste and astringency of different infant milk formulas and a variety of cereal products

| Product | sourness | bitterness | astringency |
| --- | --- | --- | --- |
| IFFO - Omneo | 31.1 | 86.2 | 81.9 |
| IFFO - HA | 35.5 | 81.8 | 72.6 |
| IFFO - Neocate/Nutrilon Standaard 2 | 22.1 | 49.6 | 42.4 |
| IFFO - Gallia | 51.8 | 37.8 | 66.6 |
| IFFO - Soy | 10.3 | 26.5 | 37.5 |
| whole wheat bread | 35.4 | 23.7 | 24.5 |
| whole grain cereal | 11.6 | 13.2 | 17.9 |
| white bread | 20.0 | 7.3 | 8.4 |

TABLE 3-continued

Sensory ratings for bitter and sour taste and astringency of different
infant milk formulas and a variety of cereal products

| Product | sourness | bitterness | astringency |
|---|---|---|---|
| IFFO - Nutrilon | 4.6 | 7.1 | 22.2 |
| rice cereal | 5.2 | 6.9 | 27.1 |

The results show that whole grain products are more bitter than the white bread and rice cereal, which supports that the acceptance of whole grain products can be improved by exposing babies to the selected infant milk formulas. The results further show that an array of infant formulas can be selected that covers a large variety in taste.

The invention claimed is:

1. A kit comprising 2 to 100 containers, each container containing an infant formula in a form suitable for administration to an infant and/or toddler or in a form suitable for administration to an infant and/or toddler after admixing with an aqueous liquid, wherein at least two of the infant formulas differ in taste and/or flavor by having different protein fractions, and wherein each of the different protein fractions is selected from the group consisting of intact milk proteins, intact plant proteins, hydrolyzed proteins, free amino acids, and mixtures of two or more thereof.

2. The kit according to claim 1, comprising at least three infant formulas which differ from each other in taste and/or flavor by having different protein fractions.

3. The kit according to claim 1, comprising an infant formula comprising hydrolyzed protein as protein fraction and an infant formula comprising soy protein as protein fraction.

4. The kit according to claim 1, wherein one or more of the infant formulas comprises one or more fruit and/or vegetable ingredients.

5. The kit according to claim 1, wherein at least one of the containers comprises an infant formula comprising a thickener in such amount that the infant formula in the form suitable for administration has a viscosity in the range of from 100 to 100,000 mPas at a shear rate of 50 per second and 20° C.

6. The kit according to claim 1, wherein at least one of the at least two infant formulas is in the form of a tablet.

7. The kit according to claim 1, wherein the intact milk proteins comprise cow milk proteins.

8. The kit according to claim 7, wherein the intact plant proteins comprise soy protein.

9. The kit according to claim 1, wherein the infant formula is in the form of a liquid.

10. The kit according to claim 1, wherein the infant formula is in the form of a powder or tablet and suitable for administration to an infant and/or toddler after admixing with an aqueous liquid.

* * * * *